Oct. 31, 1961   E. R. ZIEGLER   3,006,012
WINDSHIELD CLEANING SYSTEM
Filed Nov. 25, 1957   2 Sheets-Sheet 1

INVENTOR.
EUGENE R. ZIEGLER
BY
M. H. Strickland
HIS ATTORNEY

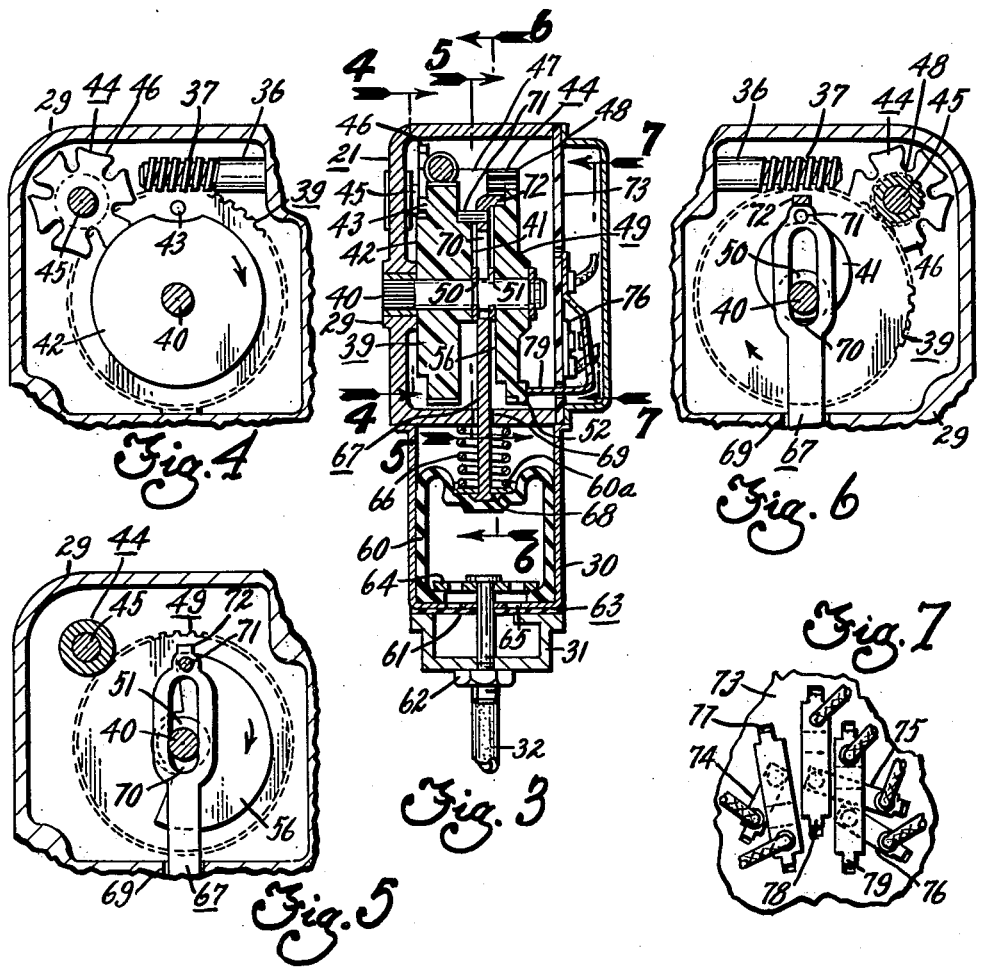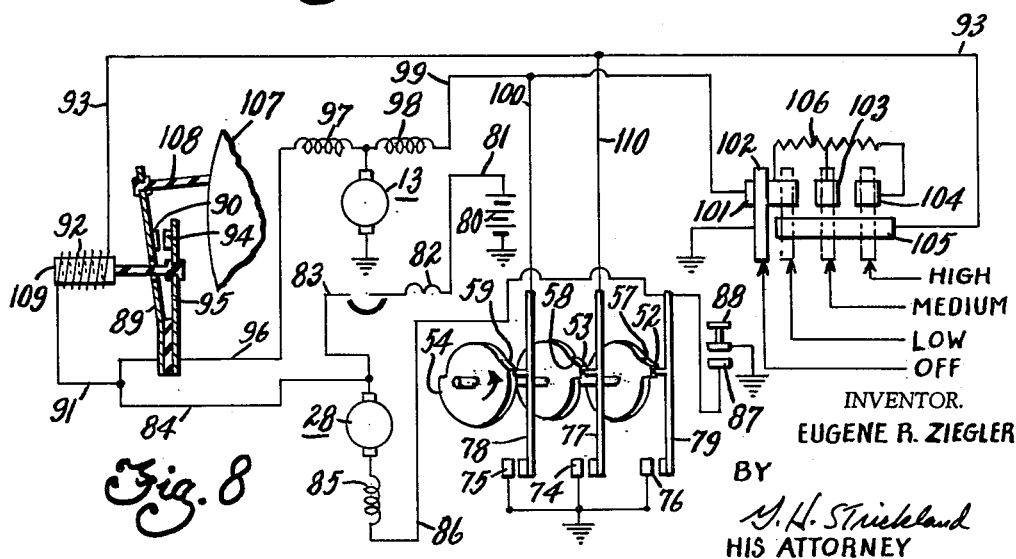

United States Patent Office 3,006,012
Patented Oct. 31, 1961

3,006,012
WINDSHIELD CLEANING SYSTEM
Eugene R. Ziegler, Spencerport, N.Y., assignor to General Motors Corporation, Detroit, Mich., a corporation of Delaware
Filed Nov. 25, 1957, Ser. No. 698,504
19 Claims. (Cl. 15—250.02)

This invention pertains to the art of windshield cleaning, and particularly to an improved windshield washer unit and a control system for effecting automatic conjoint operation of a wiper unit and a washer unit.

In my earlier application, Serial No. 634,867 filed January 18, 1957, now Patent No. 2,878,505, a windshield cleaning system is disclosed utilizing a single motor for actuating a wiper unit and a washer unit, in combination with a programing device comprising a ratchet cam for controlling an automatic cleaning cycle including washing and drying periods. However, in some instances it is desirable to have separate motors for actuating the wiper and washer units, and my present invention relates to such a system. In addition, the washing and drying periods are controlled by the washer unit motor independently of the operation of the wiper motor through a unique Geneva motion type intermittent drive. Accordingly, among my objects are the provision of a windshield cleaning system including a wiper unit, a washer unit, and a control system including a separate motor for effecting either conjoint operation of the units or operation of the wiper unit alone; the further provision of a control system for a wiper unit and a washer unit including programing means for controlling an automatic cleaning cycle; the further provision of a control system including Geneva motion means for controlling the washing and drying periods of an automatic cleaning cycle; and the still further provision of an electric motor operated washer pump.

The aforementioned and other objects are accomplished in the present invention by utilizing independent motors for actuating the wiper unit and the washer unit. The washer unit and control system is disclosed in this application in combination with a wiper unit of the type shown in copending application Serial No. 686,432 filed September 26, 1957 in the name of Harry W. Schmitz and assigned to the assignee of this invention. However, the specific wiper unit disclosed is merely exemplary, and is not to be construed as a limitation since the washer unit can obviously be used with numerous other types of wiper units.

Specifically, the washer unit comprises a direct current electric motor which is mounted on the cover of a solvent reservoir, or jar. The motor includes an armature having a shaft with an integral worm thereon, the worm meshing with a worm gear. The worm gear is rotatably journalled on a shaft, the shaft being fixedly mounted in a housing. The worm gear has a cam portion integral therewith on one face and an axially extending pin and integral disc portion on the other face. The pin constitutes the driving element of an intermittent drive including a Geneva wheel which is attached to a sleeve rotatably journalled on a shaft fixedly mounted in the housing, the shaft being parallel but spaced from the worm gear shaft. The Geneva wheel has a plurality of circumferentially spaced peripheral notches, the arrangement being such that during each revolution of the worm gear, the Geneva wheel and its sleeve are rotated throughout a predetermined angular extent.

A pinion is attached to the Geneva sleeve, this pinion meshing with the toothed periphery of a programing wheel rotatably journalled on the worm gear shaft. The programing wheel has a lock-out cam extending through an arcuate distance of somewhat less than 180° and three face cams for actuating switches.

The washer pump comprises a bulb, or bellows, one end of which is fixedly mounted in a pump housing, and the other end of which is attached to a spring seat. A coil spring is interposed between the spring seat and the gear box housing, the spring being utilized to compress the bellows and effect the delivery stroke of the pump. The pump is of the intermittent squirt type, and the spring seat is attached to a reciprocable pump rod, the pump rod being actuated by the cam on the worm gear. Thus, the pump rod has an elongate slot through which the worm gear shaft extends and has a pin constituting a cam follower which rides upon the worm gear cam. The pump rod also has an upstruck follower portion which is engageable with the lock-out cam on the programing wheel.

When the washer unit motor is energized, rotation is imparted to the worm gear. Rotation is imparted to the programing wheel through the Geneva motion intermittent drive so that as soon as the Geneva wheel moves throughout the distance of one tooth, the pump rod is released from the lockout cam, and continued rotation of the worm gear will result in intermittent operation of the pump. The pump will continue to intermittently deliver liquid solvent onto the windshield until the programing wheel is rotated throughout a predetermined angular distance at which time the pump rod follower will reengage the lock-out cam. Thereafter, during continued rotation of the programing wheel back to its initial position, that is throughout the remainder of one revolution, liquid solvent will not be discharged onto the windshield.

As alluded to hereinbefore, the novel washer unit of this invention can be utilized with a wiper unit of the type shown in copending application Serial No. 634,867. Thus, a control system has been devised to effect an automatic coordinated cleaning cycle including a washing period and a drying period. As disclosed, the washer motor can be energized by momentary closure of a push button switch. After a one tooth movement of the Geneva wheel the wiper motor will be energized for high speed operation by the face cams on the programing wheel. Thus, in the present system, liquid solvent is delivered onto the windshield simultaneously with energization of the wiper motor, since as soon as the programing wheel is moved by the Geneva motion intermittent drive the pump rod is released by the lock-out cam thereby permitting the spring to compress the bulb. During the washing period, the wiper motor is operated at high speed. Likewise, after a one tooth movement of the Geneva wheel, the push button can be released as one of the face cams on the programing wheel actuates a switch to complete the circuit for the washer motor. After completion of the washing period, the wiper motor speed is reduced to a low speed during the drying period by another face cam on the programing wheel.

After completion of the drying period, that is after a predetermined number of revolutions of the washer motor driven worm wheel, both the washer motor and the wiper motor will be automatically deenergized. The complete automatic cleaning cycle is determined by a complete revolution of the programing wheel, and thus comprises a predetermined number of revolutions of the motor driven worm gear, and thus a predetermined number of revolutions of the washer motor. Moreover, the washing period likewise constitutes a predetermined number of revolutions of the washer motor driven worm gear and the drying period is constituted by the algebraic difference between the number of revolutions in the entire cycle and the washing period. From this it can be seen that the automatic cleaning cycle is independent of both time and the number of wiper unit strokes.

Further objects and advantages of the present invention will be apparent from the following description, reference being had to the accompanying drawing wherein a preferred embodiment of the present invention is clearly shown.

In the drawings:

FIGURE 3 is a fragmentary sectional view taken along line 3—3 of FIGURE 2.

FIGURES 4, 5 and 6 are fragmentary views, partly in section and partly in elevation, taken along lines 4—4, 5—5 and 6—6, respectively of FIGURE 3.

FIGURE 7 is a fragmentary view, in elevation, taken along line 7—7 of FIGURE 3.

FIGURE 8 is an electrical schematic of a control system for the washer unit of this invention in combination with a wiper unit.

Figure 1:
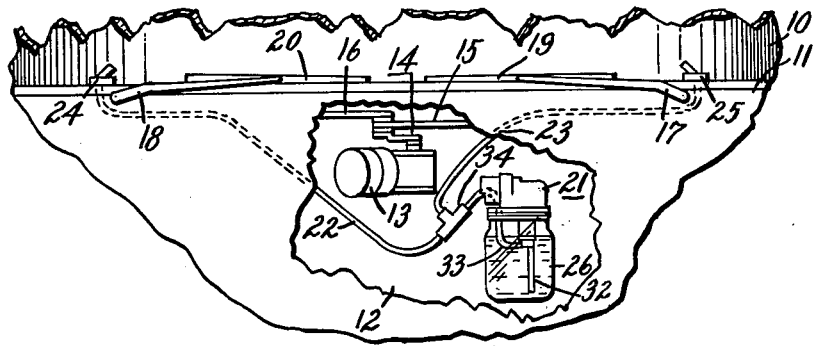
FIGURE 1 is a fragmentary view, partly in section and partly in elevation, of a washer unit constructed according to this invention.

With reference to FIGURE 1, a portion of a vehicle is shown including a windshield 10, a cowl 11 and a firewall 12. The vehicle includes cleaning apparatus comprising an electric windshield wiper motor 13 which is mounted by means of brackets, not shown, on the firewall 12. The motor includes a drive mechanism of the type shown in the aforementioned copending application, Serial No. 686,432 comprising a crank assembly 14 to which the inner ends of rigid links 15 and 16 are rotatably connected. The outer ends of the links 15 and 16 are rotatably connected to crank arms, not shown, attached to spaced pivot shafts, not shown, to which spaced wiper arms 17 and 18 are drivingly connected. The wiper arms 17 and 18 carry blades 19 and 20, the blades being movable over asymmetrical paths across the outer surface of the windshield 10. Moreover, the blades are movable to a depressed parked position against the lower rail, or cowl portion 11, of the vehicle, as depicted in FIGURE 1.

The cleaning apparatus also includes means for spraying liquid solvent onto the windshield into the path of the wiper blades 19 and 20, these means comprising a washer unit indicated generally by the numeral 21 which is mounted in the engine compartment of the vehicle. The washer unit is capable of pumping liquid solvent through conduits 22 and 23 to spaced nozzles 24 and 25 located adjacent the pivot shafts for the wiper arms 17 and 18.

Figure 2:
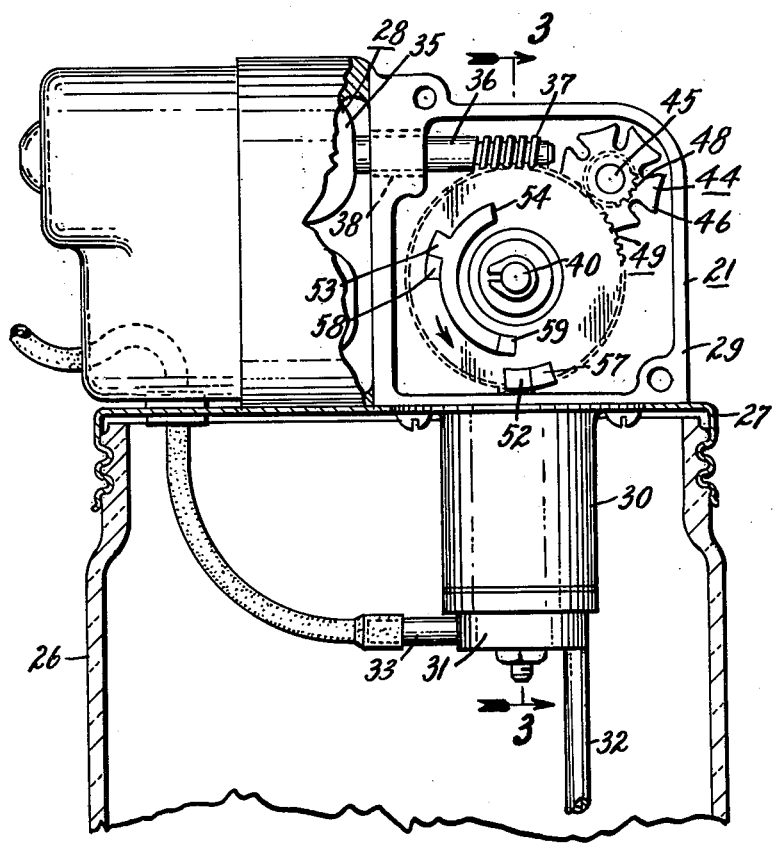
FIGURE 2 is a fragmentary view, partly in section and partly in elevation, of a washer unit constructed according to this invention.

With particular reference to FIGURE 2, the washer unit 21 comprises a solvent reservoir, or jar, 26 having a cover 27. A direct current electric motor 28 is mounted on the cover, the motor being attached to a housing 29 likewise secured to the cover. The housing 29 is attached to a pump housing 30 which extends into the jar 26. The housing 30 is attached to a connector 31 having an intake conduit 32 and a discharge conduit 33, the discharge conduit 33 being connected to a T-coupling 34 as shown in FIGURE 1.

With particular reference to FIGURES 2 through 7, the motor 28 includes an armature 35 having a shaft 36 with an integral worm 37. The shaft 36 is rotatably journalled by a bearing 38 in the housing 29, and the worm gear 37 extends thereinto. The worm 37 meshes with a worm gear 39 which is rotatably journalled on a shaft 40 fixedly mounted in the housing 29. As seen in FIGURES 3, 4 and 6, the worm gear 39 has a peripheral cam or eccentric, 41 on one face and a notched disc 42 and axially extending pin 43 on the other face.

The notched disc 42 and pin 43 constitute components of a Geneva motion drive, or intermittent drive means, which includes a Geneva wheel 44 disposed within the housing 29. The Geneva wheel 44 is rotatably mounted on a shaft 45 fixedly attached to the housing 29. The Geneva wheel includes a plurality of teeth 46 having notches therebetween adapted to receive the pin 43. The ends of the teeth 46 are of concave configuration, as shown in FIGURE 4 and coact with the disc 42 so as to prevent rotation of the Geneva wheel 44 at all times except when the pin 43 engages a notch in the Geneva wheel. The Geneva wheel is integral with the sleeve 47 having a toothed portion 48 constituting a pinion. The pinion meshes with a gear 49 rotatably journalled on shaft 40 and axially spaced from the worm gear 39. The gears 39 and 49 are maintained in predetermined axial spaced relation by snap rings 50 and 51.

The gear 49 constitutes a programing wheel which, as seen in FIGURES 2 and 5, has a plurality of face cams 52, 53 and 54 on one side and a peripheral lock-out cam 56 on the other side. The lock-out cam 56 is of an arcuate extent somewhat greater than 180° and terminates in abrupt shoulders, as shown in FIGURE 5. The face cams 52, 53 and 54 include inclined lead portions 57, 58 and 59 respectively, and likewise terminate in abrupt shoulders at their other ends.

Referring particularly to FIGURE 3, the washer pump comprises an elastomeric bellows, or fluid displacing member, 60 disposed within the housing 30. The open end of the bellows is fixedly attached to the housing 30 and the connector 31 by a bolt and nut assembly 62. A perforated washer 64 is interposed between the head of the bolt and nut assembly 62 and the inwardly flanged open end of the bellows, or bulb 60. A flexible type rubber check valve assembly 63 is interposed between the pump housing 30 and the connector 31, the check valve assembly including an outlet one-way check valve 61 and an inlet one-way check valve 65, of conventional construction. The closed end of the bellows 60 has a spring seat 60a attached thereto by any suitable means, such as by bonding. The spring seat is engaged by one end of coil springs 66, and the other end of which engages the housing 29. In addition, a reciprocable pump rod 67 has a flanged portion 68 disposed between the seat 60a and the top of the bellows 60, the spring 66 encircling the rod 67. The rod extends through an opening 69 in the housing 29 and has an elongate longitudinal slot 70 through which the shaft 40 extends. The rod is disposed between the gears 39 and 49 as shown in FIGURE 3 and has a cam follower pin 71 extending towards the gear 39 and an outstruck tang follower extending towards the programing wheel 49.

The spring 66 performs two functions, namely to compress the bellows 60 and to maintain the followers 71 and 72 in engagement with their respective cams 41 and 56. The cam 41 constitutes the pump actuating mechanism for imparting upward movement to the rod 67 thereby expanding the bellows 60 to effect the intake stroke of the pump. During the intake stroke of the pump liquid solvent from the reservoir 26 is drawn through the intake conduit 32 through check valve 65. Upon rotation of the worm gear 39, the spring 66 will collapse the bellows 60 to effect the delivery stroke of the bellows pump by forcing liquid solvent through the check valve 61 to conduit 33.

The cam 56 constitutes a lock-out cam for preventing pump operation, or interrupting the driving connection between the eccentric 41 and the rod, during a predetermined portion of each revolution of the programing wheel 49. Thus, as long as the follower 72 engages the lock-out cam 56 the spring 66 cannot collapse the bellows 60, and hence liquid solvent will not be discharged onto the windshield of the vehicle.

The face cams 52, 53 and 54 are utilized to actuate switches for controlling the energization of the wiper unit motor 13 as well as the washer unit motor 28. As seen in FIGURES 3 and 7, each of the cams 52, 53 and 54 control a switch comprising a movable contact carried by a leaf spring and a fixed contact attached to an insulating plate 73 that closes one side of the housing 29. The fixed contacts are indicated by numerals 74, 75 and 76. The movable contacts are carried by leaf spring cam followers 77, 78 and 79 respectively. As seen in FIGURE 3, the leaf spring follower 79 is engageable with the cam 52, such that when the leaf spring follower 79 engages the high portions of the cam 52 the leaf spring carried contact is separated from its stationary contact 76. Similarly, when the leaf springs 77 and 78 engage the high portion of their respective cams 53 and 54 respectively, these leaf spring carried contacts do not engage their respective stationary contacts 74 and 75, respectively. However, when the leaf spring followers engage the end face of the programing wheel 49, the leaf spring carried contacts engage the fixed contacts carried by the insulating plate 73.

With particular reference to FIGURE 8, a control system for effecting conjoint operation of the washer of this invention with an electric motor driven wiper unit of the type disclosed in the aforementioned copending application Serial No. 686,432 will be described. The energizing circuits for both the wiper motor 13 and the washer motor 28 include a battery 80, one terminal of which is connected to ground and the other terminal of which is connected to a wire 81 through a thermal overload circuit breaker 82 to a wire 83. Wire 83 is connected to one armature brush of the motor 28 and is also connected to a wire 84. The washer motor 28 is of the series wound type, and thus the other armature brush is connected to one end of the series field winding 85. The other end of the field winding 85 is connected to a wire 86 which is connected to leaf spring 79 as well as a stationary contact 87. The leaf spring 79 carries a contact engageable with fixed contact 76 which, as shown, is connected to ground. The contact 87 can be engaged by a movable push button operated contact 88 which is likewise connected to ground.

The wire 84 is connected to a leaf spring 89 which carries contact 90 constituting part of the parking switch for the wiper unit motor. The wire 84 also connects with a wire 91 which is connected to one end of a relay coil 92, the other end of the relay being connected to a wire 93.

The parking switch also includes a second contact 94 carried by a leaf spring 95, the leaf spring 95 being connected to a wire 96. The wire 96 is connected with one end of a series field winding 97 of the wiper unit motor 13, this motor being of the compound wound type and also including a shunt field winding 98. The other end of the series field winding 97 is connected to the shunt field winding 98 and to one armature brush of the motor 13. The other armature brush of the motor 13 is connected to ground.

The other end of the shunt field winding 98 of the wiper unit motor is connected to a wire 99 which is connected to a wire 100 as well as to a stationary contact 101 of a manual wiper control switch. The wire 100 connects with the leaf spring 78 which carries a contact engageable with stationary contact 75. The manual wiper unit control switch includes a movable bridging member 102 which is connected to ground. The wiper unit switch also includes stationary contacts 103, 104, 105. Contact 101 is connected to one end of a resistor 106; contact 103 is connected to an intermediate part of resistor 106; and contact 104 is connected to the other end of resistor 106. Contact 105 is connected to the wire 93. As disclosed, the wiper unit motor 13 can be operated at three speeds, namely "low" wherein one end of the shunt field 98 is connected to ground; "medium" wherein part of the resistor 106 is connected in series with the shunt field winding; and "high" wherein the entire resistor 106 is connected in series with the shunt field winding. In the "off" position, as indicated, the bridging member 102 does not engage contact 105. However, when the bridging member 102 is moved from any of the running positions to the "off" position, the wiper unit motor 13 will remain energized through the parking switch contacts 90 and 94. When the wiper blades arrive at the parked position, as shown in FIGURE 1, a cam 107 driven by the wiper motor 13 will actuate the leaf spring 89 through follower 108 to move contact 90 out of engagement with contact 94 whereupon the motor 13 will be deenergized. When the bridging member 102 is moved from the "off" position to any running position, the relay winding 92 is energized thereby effecting movement of the magnetic core 109 to the left as viewed in FIGURE 8 to reengage contacts 90 and 94 irrespective of the follower 108 engaging the cam 107. Wire 93 is connected by a wire 110 to leaf spring 77 which carries a contact engageable with contact 74. Operation of the wiper unit and the washer unit to effect an automatic cleaning cycle is as follows. Momentary closure of the push button switch 88 by the operator completes the energizing circuit for the washer motor 28. Accordingly, the worm gear 39 will be rotated by the worm 37 in the direction of the arrow, as shown in FIGURE 4. As soon as the pin 43 engages a notch in the Geneva wheel 44, the Geneva wheel will move throughout one-sixth of a revolution thereby imparting angular movement to the programing wheel 49 through the pinion 48. As soon as the programing wheel 49 is moved by one tooth movement of the Geneva wheel 44, the leaf spring followers 79 and 77 will be disengaged from their respective cams 52 and 53 whereupon the contacts carried by these leaf springs will engage contacts 76 and 74, respectively which are connected to ground. Thereafter, the push button switch 88 can be released, since the motor 28 will be energized through contact of leaf spring 79 and contact 76. Moreover, as soon as the worm gear 39 begins rotating, and the programing wheel 49 has been moved by a one tooth movement of the Geneva wheel 44, the follower 72 will be released from lock-out cam 56 so that the bellows 60 can be collapsed by the spring 66 as permitted by the cam follower 71 and cam 41. Simultaneously, with discharge of liquid solvent onto the windshield, engagement between leaf spring 77 and contact 74 will close the energizing circuit for the motor 13 at high speed. The motor 13 will operate at high speed since the shunt field winding 98 is deenergized due to the fact that the contact carried by leaf spring 78 does not engage contact 75. The arcuate extent of the cam 54 is equal to 360° minus the arcuate extent of the cam 56. Accordingly, as soon as the follower 72 reengages the lock-out cam 56, the leaf spring 78 will be disengaged from the cam 54 permitting its contact to engage contact 75 whereupon the motor 13 will operate at low speed as the shunt field winding 98 is fully energized. Thus, during the washing cycle when the pump is operative the wiper unit motor operates at high speed, while during the drying period the wiper unit motor operates at low speed. The automatic cleaning cycle will continue until the programing wheel 49 has completed one revolution, at which time all of the leaf springs 77, 78 and 79 will engage the cams 53, 54 and 52, respectively so as to deenergize the washer unit motor 28 and enable the wiper unit motor 13 to be automatically deenergized through the parking switch.

Since operation of the washer unit motor 28 is independent of the wiper unit motor 13, the duration of the washing and drying periods in the automatic cleaning cycle are independent of the operation of the wiper motor 13. The duration of the automatic cleaning cycle is determined solely by a complete revolution of the programing wheel 49, which requires a predetermined number of revolutions of the Geneva wheel 44 and hence a greater number of revolutions of the worm gear 39 and the motor 28. Likewise, the washing period is determined by the arcuate extent of the lock-out cam 56, as is the drying period.

While the embodiments of the invention as herein disclosed constitute a preferred form, it is to be understood that other forms might be adopted.

What is claimed is as follows:

1. A windshield cleaning system including, a wiper unit, a first motor for operating the wiper unit, a washer unit, a second motor for operating the washer unit, means to set both units in operation conjointly, and programing means for continuing conjoint operation of said units for a first predetermined number of revolutions of said second motor, said programing means continuing operation of said wiper unit for a second predetermined number of revolutions of said second motor after said washer unit has stopped.

2. A washer pump unit for a vehicle windshield including, a motor having a rotating element, a cam driven by said element, a reciprocable pump rod having a follower engageable with said cam whereby said rod is normally reciprocated during rotation of said cam, a washer pump including a fluid displacing member having an intake stroke and a delivery stroke, said rod being operatively connected with said fluid displacing member for effecting the intake stroke thereof, and means coaxial with said cam and engageable with said rod for preventing reciprocation of said rod during rotation of said cam to inactivate said pump.

3. A washer pump unit for a vehicle windshield including, a motor having a rotating element, a cam driven by said element, a reciprocable pump rod having a follower engageable with said cam whereby said rod is normally reciprocated during rotation thereof, a washer pump including a fluid displacing member having an intake stroke and a delivery stroke, resilient means acting constantly on said member for effecting the delivery stroke, said rod being operatively connected with said fluid displacing member for effecting the intake stroke thereof, and means coaxial with said cam and engageable with said rod for preventing reciprocation of said rod during rotation of said cam to inactivate said pump.

4. A washer pump unit for a vehicle windshield including, a motor having a rotating element, an eccentric driven by said element, a reciprocable pump rod having a follower engageable with said eccentric whereby said rod is normally reciprocated during rotation thereof, a washer pump including a fluid displacing member having an intake stroke and a delivery stroke, resilient means acting constantly on said member for effecting the delivery stroke thereof, said rod being operatively connected with said member for effecting the intake stroke thereof, a cam driven by said rotating element and co-axial with said eccentric, and follower means on said rod engageable with said cam during a portion of its rotation for preventing reciprocation of said rod during rotation of said eccentric to inactivate said pump.

5. A washer pump unit for a vehicle windshield including, a motor having a rotating element, an eccentric driven by said element, a reciprocable pump rod having a follower engageable with said eccentric whereby said rod is normally reciprocated during rotation thereof, a washer pump including a fluid displacing member having an intake stroke and a delivery stroke, resilient means acting constantly on said member for effecting the delivery stroke thereof, said rod being operatively connected with said member for effecting the intake stroke thereof, a lock-out cam coaxial with said eccentric, an intermittent driving connection between said eccentric and said cam whereby each revolution of said eccentric imparts a predetermined angular movement to said lock-out cam, and follower means on said rod engageable with said lock-out cam for preventing reciprocation of said rod during a predetermined angular movement of said lock-out cam.

6. The washer unit set forth in claim 5 wherein said resilient means maintains said follower in engagement with said eccentric and said follower means in engagement with said lock-out cam during said predetermined angular movement of said lock-out cam, and wherein the intermittent drive means between said eccentric and said lock-out cam includes a Geneva wheel.

7. The washer unit set forth in claim 5 wherein said eccentric and said lock-out cam are axially spaced apart, and wherein said rod is disposed therebetween with said follower extending in one direction and said follower means extending in the opposite direction.

8. A washer pump unit for a vehicle including, an electric motor having a rotating element, an eccentric driven by said element, a reciprocable pump rod having a follower engaging said eccentric so as to be reciprocated during rotation thereof, a washer pump including a fluid displacing member having an intake stroke and a delivery stroke, resilient means acting constantly on said member for effecting the delivery stroke thereof, said rod being operatively connected with said member for effecting the intake stroke thereof, a programing wheel coaxial with said eccentric and having a cam surface thereon, intermittent driving means interconnecting said eccentric and said programing wheel whereby a complete revolution of said eccentric will impart a predetermined angular movement to said programing wheel, a circuit for energizing said motor including a manually operable first switch and a second switch connected in parallel therewith, and follower means engageable with the cam surface on said programing wheel for opening said second switch in one predetermined angular position of said programing wheel and permitting said second switch to be closed during all other angular positions of the said programing wheel whereby upon momentary closure of said first switch said programing wheel will control the operation of said washer unit through a complete cycle.

9. A windshield cleaning system including, a wiper unit, a first motor for operating the wiper unit, a washer unit, a second motor for operating the washer unit, means to set both units in operation conjointly, programing means driven by said second motor for continuing conjoint operation of said units for a first predetermined number of revolutions, and an interruptible driving connection between said second motor and said washer unit, said programing means interrupting the driving connection between the washer unit and said second motor and continuing operation of said wiper unit for a second predetermined number of revolutions of said second motor after the washer unit has stopped.

10. A windshield cleaning system including, a wiper unit, a first motor having a continuous driving connection with said wiper unit, a washer unit, a second motor having an interruptible driving connection with said washer unit, programing means having an intermittent driving connection with said second motor, and means to set both units in operation conjointly, said programing means continuing conjoint operation of the units for a first predetermined number of revolutions of said second motor, said programing means thereafter interrupting the driving connection between said second motor and said washer unit and continuing operation of said wiper unit for a second predetermined number of revolutions of said second motor and thereafter inactivating both motors.

11. A windshield cleaning system including, a wiper unit, a first electric motor having a continuous driving connection with the wiper unit, a washer unit, a second electric motor having an interruptible driving connection with the washer unit, programing means having an intermittent driving connection with said second motor, and means to set both units in operation conjointly, said programing means continuing conjoint operation of said units for a first predetermined number of revolutions of said second motor, said programing means thereafter interrupting the driving connection between the second motor and said washer unit and continuing operation of said wiper unit for a second predetermined number of revolutions of said second motor, said programing means then automatically deenergizing both motors.

12. A windshield cleaning system including, a wiper unit, a first electric motor having a continuous driving connection with the wiper unit, a washer unit, a second electric motor having an interruptible driving connection with the washer unit, programing means having an intermittent driving connection with said second motor, circuits for energizing said motors, a manual switch in the second motor circuit for energizing the second motor, and automatic switch means controlled by said programing means for continuing the energization of said second motor independently of said manual switch and energizing said first motor to set both units in operation conjointly, said programing means continuing conjoint operation of said units for a first predetermined number of revolutions of said second motor, said programing means then interrupting the driving connection between said second motor and said washer unit and continuing operation of said wiper unit for a second predetermined number of revolutions of said second motor, said programing means thereafter actuating said automatic switch means to deenergize both motors.

13. The cleaning system set forth in claim 12 wherein said second motor is drivingly connected to a gear, said gear having an eccentric thereon for actuating said washer unit.

14. The cleaning system set forth in claim 12 wherein said second motor is drivingly connected to a gear, wherein said programing means comprises a wheel coaxial with said gear, and wherein the intermittent driving connection between said programing wheel and said second motor includes a Geneva wheel driven by said gear.

15. The cleaning system set forth in claim 14 wherein said gear and said programing wheel are axially spaced apart, and wherein said washer unit includes a reciprocable pump rod disposed therebetween, said gear having an eccentric thereon, said programing wheel having a lock-out cam thereon, and wherein said pump rod a pair of followers engageable with said eccentric and lock-out cam respectively, said lockout cam interrupting the driving connection between said second motor and said pump rod when one of said followers engages said lock-out cam.

16. The cleaning system set forth in claim 14 wherein said programing wheel has a plurality of cam surfaces thereon, and wherein said automatic switch means are controlled by said cam surfaces.

17. A windshield cleaning system including, a wiper unit, a first electric motor for operating the wiper unit, a washer unit, a second rotary electric motor for operating the washer unit, means to set both units in operation conjointly, and programing means for continuing conjoint operation of said units for a predetermined number of revolutions of said second motor and thereafter automatically arresting said washer unit.

18. A windshield cleaning system including, a wiper unit, a first electric motor for operating the wiper unit, a washer unit, a second rotary electric motor for operating the washer unit, first means to set the wiper unit in operation independently of the washer unit, second means to set both units in operation conjointly, and programing means for continuing conjoint operation of both units for a predetermined number of revolutions of said second motor and thereafter automatically arresting said washer unit.

19. A windshield cleaning system including, a wiper unit, a first motor for operating the wiper unit, a washer unit, a second motor for operating the washer unit, means to set both units in operation conjointly, programing means driven by said second motor for continuing conjoint operation of said units for a predetermined interval, and an interruptible driving connection between said second motor and said washer unit, said programing means interrupting the driving connection between said washer unit and said second motor to automatically arrest said washer unit after said predetermined interval.

References Cited in the file of this patent

UNITED STATES PATENTS

| | | |
|---|---|---|
| 2,688,514 | Oishei et al. | Sept. 7, 1954 |
| 2,816,316 | Oishei | Dec. 17, 1957 |
| 2,870,476 | Oishei | Jan. 27, 1959 |
| 2,877,485 | Oishei | Mar. 17, 1959 |
| 2,878,505 | Ziegler | Mar. 24, 1959 |

FOREIGN PATENTS

| | | |
|---|---|---|
| 733,640 | Great Britain | July 13, 1955 |